US008488767B2

(12) United States Patent
Richartz et al.

(10) Patent No.: US 8,488,767 B2
(45) Date of Patent: *Jul. 16, 2013

(54) TECHNIQUE FOR SELECTIVE PRESENTATION OF INFORMATION IN RESPONSE TO A REQUEST FOR INFORMATION ASSISTANCE SERVICE

(75) Inventors: John D. Richartz, Portland, OR (US); John S. Miller, Canby, OR (US)

(73) Assignee: Grape Technology Group, Inc., Bethlehem, PA (US)

( * ) Notice: Subject to any disclaimer, the term of this patent is extended or adjusted under 35 U.S.C. 154(b) by 356 days.

This patent is subject to a terminal disclaimer.

(21) Appl. No.: 12/719,038

(22) Filed: Mar. 8, 2010

(65) Prior Publication Data

US 2011/0216895 A1 Sep. 8, 2011

Related U.S. Application Data

(63) Continuation of application No. 10/447,501, filed on May 28, 2003, now Pat. No. 7,711,745.

(51) Int. Cl.
*H04M 3/42* (2006.01)

(52) U.S. Cl.
USPC .................... 379/218.01; 707/770

(58) Field of Classification Search
USPC .................... 379/218.01; 707/770
See application file for complete search history.

(56) References Cited

U.S. PATENT DOCUMENTS

| | | | |
|---|---|---|---|
| 5,463,685 A * | 10/1995 | Gaechter et al. | 379/210.01 |
| 6,377,567 B1 * | 4/2002 | Leonard | 370/352 |
| 6,529,731 B2 * | 3/2003 | Modzelesky et al. | 455/427 |
| 6,577,714 B1 | 6/2003 | Darcie et al. | |
| 6,937,711 B2 * | 8/2005 | Baker | 379/114.12 |
| 6,999,574 B2 | 2/2006 | Baker | |
| 2004/0006557 A1 * | 1/2004 | Baker et al. | 707/3 |
| 2004/0044585 A1 | 3/2004 | Franco | |
| 2004/0267615 A1 | 12/2004 | Rothbaum | |
| 2007/0072591 A1 * | 3/2007 | McGary et al. | 455/414.1 |
| 2007/0185844 A1 * | 8/2007 | Schachter | 707/3 |

* cited by examiner

*Primary Examiner* — Amal Zenati
(74) *Attorney, Agent, or Firm* — Sofer & Haroun, LLP

(57) ABSTRACT

In accordance with the present invention, when a user makes an information assistance call to an information/call center requesting a listing, the user can make arrangements for various services relating to the requested listing in the same call. These services may be presented to an operator as options, and in turn presented to the user for selection. However, the options undesired by the user, based on personal preferences stored in a personal profile, or unsupported by the telephone service to which the user subscribes are not presented to the operator and thus not made available to the user. If the user is interested in any of the available options, the operator accesses the selected option and makes an appropriate arrangement for the underlying service for the user.

7 Claims, 8 Drawing Sheets

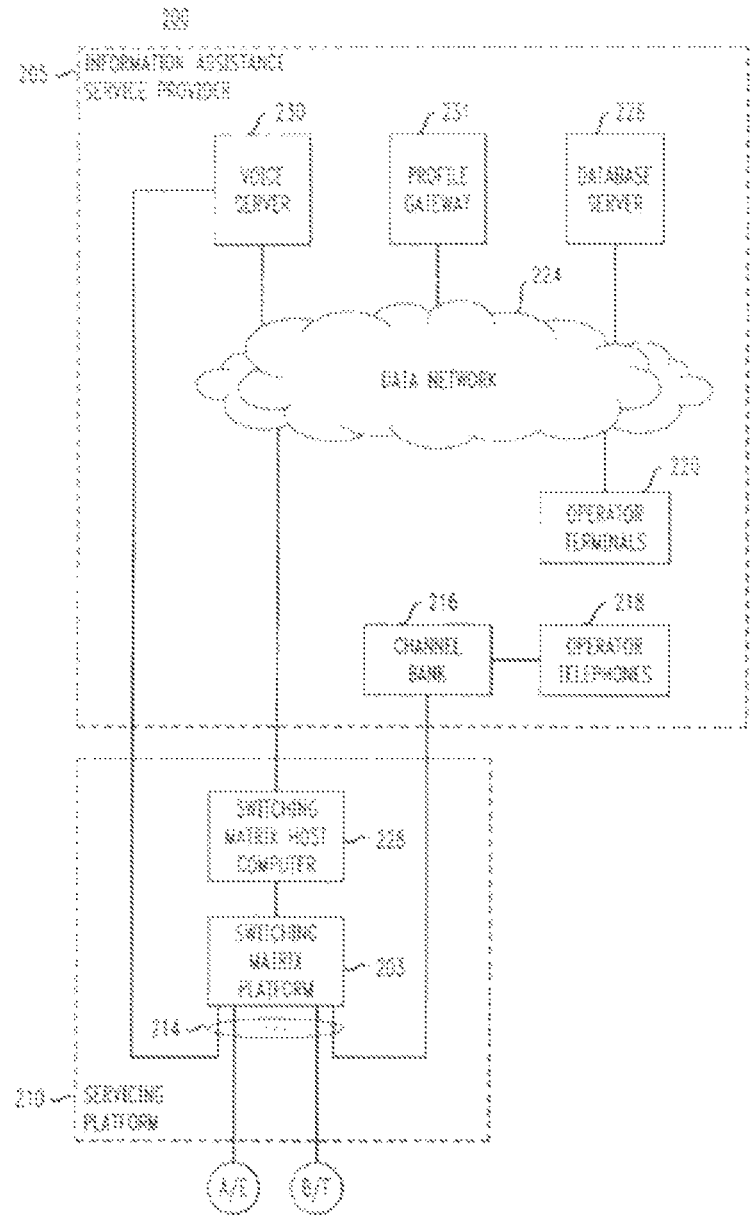

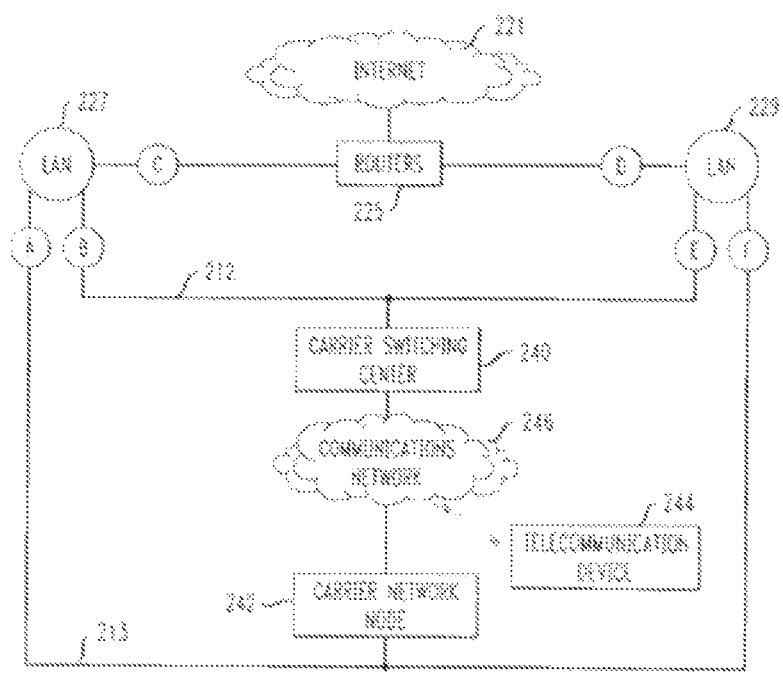

FIG. 3
300

| CATEGORY | NAME | PHONE NUMBER | ASSOCIATED OPTIONS |
|---|---|---|---|
| 305 | 310 | 315 | 320 |
| HOTEL | HILTON HOTEL | 503-234-4600 | HILTON RESERVATION — 380 |
| | | | HILTON RESTAURANT — 381 |
| | | | RENTAL CARS — 382 |
| | | | MOVIES — 383 |
| | | | SIGHTSEEING — 384 |
| | | | OUTLET SHOPPING — 385 |

FIG. 4
400

| CATEGORY | PREFERENCES |
|---|---|
| 405 | 410 |
| ? | |
| HOTEL | NO MOVIES — 480 |
| | NO CARS — 481 |
| SHOPPING | NO SHOES — 482 |
| ? | |
| AT&T ONE-RATE SERVICE PLAN — 490 | |

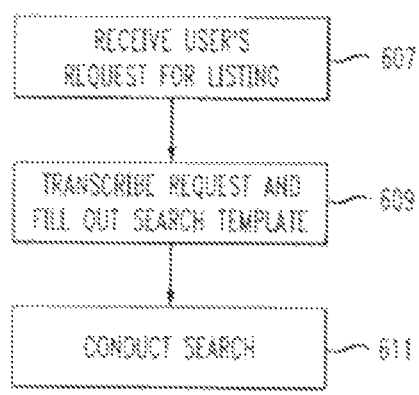

US 8,488,767 B2

TECHNIQUE FOR SELECTIVE PRESENTATION OF INFORMATION IN RESPONSE TO A REQUEST FOR INFORMATION ASSISTANCE SERVICE

RELATED APPLICATION

This application is a continuation of U.S. patent application Ser. No. 10/447,501, filed on May 28, 2003, the entirety of which is incorporated by reference.

FIELD OF THE INVENTION

The invention relates to a communications system and method, and more particularly to a system and method for selectively presenting information to a service provider to assist a user who requested information assistance.

BACKGROUND OF THE INVENTION

It is commonplace that a user calls an information assistance service for information, e.g., a telephone listing of a desired party, identified by the party's name and location, e.g., city and state. In response, the service searches a conventional database, e.g., electronic white pages (EWP), containing listings associated with the specified city and state. Oftentimes a user needs more than one phone number, as she tries to accomplish multiple related tasks. For example, a user asking for a hotel's phone number is very likely to be interested in one or more of travel related services, e.g., making a reservation at that hotel, making a dinner reservation at the hotel's or a nearby restaurant, booking a sightseeing tour of the city where the hotel is located, or renting a car. In prior art, a user or her agent needs to first identify the necessary travel-related services, and decide on the particular vendors rendering the identified services, e.g., the desired restaurants, companies offering sightseeing tours, and car rental companies. The user (or agent) may then need to call the information assistance service for telephone numbers to contact the vendors to make desired arrangements. This process is time-consuming because the user (or agent) has to call multiple vendors and repeat the same information, e.g., name, credit card number, etc. over and over again. Oftentimes the same vendor is called more than once if it could not be reached in a prior call.

SUMMARY OF THE INVENTION

The present invention overcomes the prior art limitations by suggesting, to a caller requesting a desired listing, related services associated with the requested listing, which can be arranged in the same call. These services may be presented as options on an operator's terminal, which the operator in turn presents to the caller for selection. In an embodiment of the invention, the service options associated with the desired listing which are not consistent with preferences associated with the caller, e.g., the caller's personal preferences stored in a personal profile, or those of the telephone carrier to which the user subscribes, are not presented to the operator and thus not made available to the caller. If the caller is interested in any of the available service options, the operator exercises the service option(s) and makes appropriate arrangements for the underlying service(s).

The caller's personal profile may be identified by the caller's phone number or an automatic number identification (ANI) derivable from the call set-up signals. The preferences of a particular carrier may vary from service plan to service plan of the carrier. The actual service plan which the caller is on may be referenced in the personal profile.

BRIEF DESCRIPTION OF THE DRAWINGS

Further objects, features and advantages of the invention will become apparent from the following detailed description taken in conjunction with the accompanying drawing showing an illustrative embodiment of the invention, in which:

FIGS. 2A and 2B are block diagrams of components of the communications system of FIG. 1;

FIG. 3 illustrates a record associated with a listing requested by a user of the communication system of FIG. 1;

FIG. 4 illustrates a user personal profile in accordance with the invention;

FIG. 5 illustrates a record containing a carrier's preferences in accordance with the invention;

FIG. 6 is a flow chart depicting a routine for processing an information assistance call in accordance with the invention;

DETAILED DESCRIPTION

Figure 1:
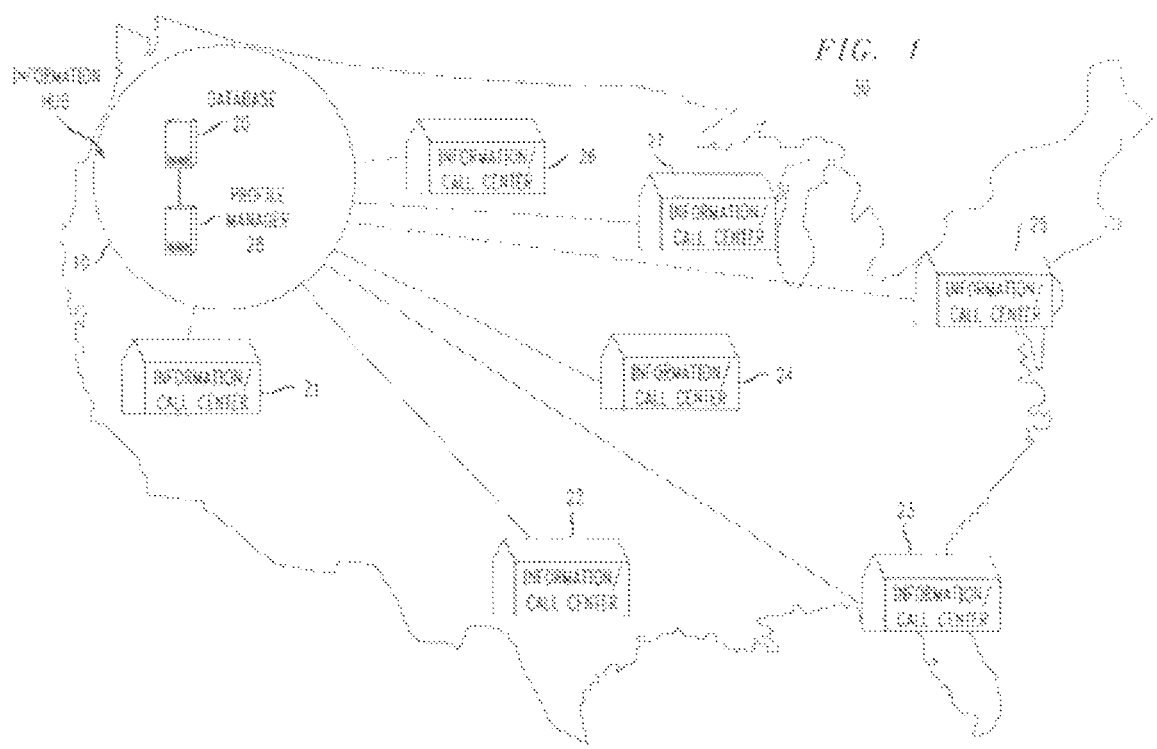
FIG. 1 illustrates a communications system including information/call centers in accordance with the invention.

The invention is directed to providing information assistance. For example, a user may call an information assistance provider to request a desired listing. In accordance with the present invention, the provider not only provides the requested listing, but also suggests to the user related services associated with the requested listing, which can be arranged in the same call. These services may be presented as options on an operator's terminal, which the operator in turn presents to the user for selection. In an embodiment of the invention, the service options not desired by the user, based on personal preferences stored in a personal profile, or not supported by the telephone carrier to which the user subscribes are not presented to the operator and thus not made available to the user. If the user is interested in any of the available service options, the operator exercises the service option(s) and makes appropriate arrangements for the underlying service (s). Not only are the users benefited by being able to select related service options in one phone call to the information assistance provider, and thus, save time, e.g., by having repetitive information about the user automatically forwarded to each service vendor, but also the vendors of such services enjoy a considerable business advantage. The participating vendors are benefited by being presented to the user at a time when she is ready to make a related purchase, thereby increasing the likelihood that she would select one of the participating vendors.

The service options presented to the operator are selected from a group of options associated with the requested listing based on information stored in various databases in accordance with the present invention. One such database is an options database containing records of service options associated with the category of listing and/or particular listing requested by the user. For example, a record in the options database for a movie theater listing may contain options of the services that a moviegoer may enjoy before or after seeing a movie, e.g., a restaurant, a bowling alley, a bar, a dance club, etc. Another database containing users' personal profiles is maintained, which includes each user's likes and dislikes, e.g., "not interested in dancing," "doesn't like cars," etc. In accordance with the present invention, the selection of the service options may be subject to the user preferences. In addition, a carriers database is maintained, which contains preferences of various carriers, e.g., AT&T, Verizon, Sprint, etc. which contracted the subject information assistance provider to provide information assistance to their subscribers. The preferences of a particular carrier may vary from service plan to service plan of the carrier. Thus, the preferences contained in the carriers database are grouped according to service plans of individual carriers, e.g., AT&T one-rate service plan, Verizon premium service plan, Sprint family service plan, etc. For example, AT&T may prefer to make available to its one-rate service plan members all service options offered by the directory assistance provider except, say, a sightseeing (tour operators) option.

When a user calls to request a listing, e.g., of a movie theater, service options associated with that movie theater listing are retrieved from the options database. The information assistance provider in a well know manner derives, from the call set-up signals in the received call, an automatic number identification (ANI) associated with the user's telephone. Applicable services associated with the movie theater, e.g., a restaurant, a bowling alley, a bar, a dance club, are compared against the user's preferences (e.g., no dancing, no cars) associated with the ANI and carrier's preferences associated with the user. As a result of this comparison, the restaurant option, the bowling option, and the bar option are presented to the operator (in a form of a hard or soft key on the operator's terminal), who in turn informs the user about them. Since the user is not interested in dancing, the dancing option is not presented to the operator and thus not made available to the user.

The user may select any of the options presented to the operator, receive information about it including, e.g., special offers, coupons and other promotional information, and make appropriate service arrangements through the operator. For example, after the user informs the operator that she is interested in the restaurant option, the operator selects the restaurant option key, and a new set of options may be further presented for user selection, which may concern the business hours of the restaurant, its menu, and any reservation requirement. For example, a restaurant reservation may be made by the operator for the user through a direct link to the vendor's computer system, or through a reservation service provided by the information assistance provider.

FIG. 1 illustrates a communications system embodying the principles of the invention for providing, inter alia, an improved search for desired listings in the information assistance service. This communication system includes wide area network (WAN) 30 covering an extensive area. WAN 30 may be an Internet-based network such as the World Wide Web or an intranet. WAN 30 connects operators dispersed throughout a wide coverage area in information/call centers 21 through 27. One or more information hubs 10 are also included in WAN 30. An information hub 10 includes one or more profile managers 28, and one or more databases 20.

Referring to FIGS. 2A and 2B, information/call center 200 (which generically represents one of aforementioned information/call centers 21 through 27) is attended by operators, which includes information assistance service provider 205 and servicing platform 210. It should be noted that even though both provider 205 and servicing platform 210 appear in the same figure, they may or may not be located in the same geographic area. Servicing platform 210 comprises switching matrix host computer 228, and switching matrix platform 203 which is connected via T1 communication links 214 to, among others, voice server 230 and channel bank 216 in provider 205.

Channel bank 216 is used to couple multiple operator telephones 218 to platform 203. The operators in center 200 are further equipped with operator terminals 220, each of which includes a video display unit and a keyboard with associated dialing pad. Operator terminals 220 are connected over data network 224 to one or more database server(s) 226 (although only one is shown here). Database server 226 provides access to, among others, directory information from multiple sources. Data network 224 further connects to voice server 230, profile gateway 231, and switching matrix host computer 228, which in turn is connected to switching matrix platform 203 via a data link. Data network 224 includes, but is not limited to, local area network (LAN) 227, best seen in FIG. 2B. LAN 227 may connect to other similar remote LANs 229 to form WAN 30 in FIG. 1. LANs 227 and 229 are connected to one another and to Internet 221 via routers 225.

In FIG. 2B, a user's telephone, computer, PDA or other telecommunication device 244 communicates via communications network 246 which is connected to carrier network node 242 and carrier switching center 240. T1 voice links 212 provide connection between the information/call center's switching matrix platform 203 and carrier's switching center 240, through which incoming information service calls are received. T1 voice links 212 further provide connection to the carrier switching center 240 through which outgoing calls are placed over communications network 246 (which network may be different than that used for incoming calls). Similarly, T1 data links 213 provide a signaling connection between the information/call center's node (not shown) and carrier network node 242, through which incoming and outgoing signaling messages are transported. The information/call center node is contained within switching matrix platform 203, but one with skill in the art will appreciate that the information/call center node could also be a physically distinct component. If the outgoing call is being placed over a different network than that on which the incoming call was received, a second data connection to the outgoing network will be established.

The operation of switching matrix platform 203 is governed by computer-readable instructions stored and executed on switch matrix host computer 228. In this illustrative embodiment, platform 203 includes, inter alia, arrays of digital signal processors (DSPs). These DSPs can be programmed and reprogrammed to function as, among other things, call progress analyzers (CPAs), call progress generators (CPGs), multi-frequency (NW) tone generators/detectors, dual-tone multi-frequency (DTMF) generators/detectors, or conference units, depending on the demand placed on center 200 and platform 203 for each corresponding function.

Voice server 230 is connected via data network 224 to computer 228 (to which it acts as a slave processor) and via one or more T1 links to switching matrix platform 203. Each voice server 230 when more than one is employed in information/call center 200, connects to switching matrix platform 203 via a separate T1 link. Voice server 230 comprises a general purpose computer incorporating one or more voice cards, which serve as the interface between server 230 and the T1 span to switching matrix platform 203. One such voice card in server 230 monitors and controls communications over the T1 span. Its capabilities include telephone tone (e.g., DTMF or MF) detection and generation; voice recording and playback, and call progress analysis. Voice server 230 in this instance also contains a voice recognition device for receiving verbal input from a party connected thereto. Voice server 230 is employed to play the constantly repeated parts of an operator's speech, namely, the various greetings and sign offs (or closings), the caller's desired telephone number where requested, and possibly other information. At appropriate stages in a call progression, switch matrix host computer 228 initiates a voice path connection between voice server 230 and switching matrix platform 203 such that the user, or the user and the operator, are able to hear whatever pre-recorded speech is played on that connection by voice server 230. Host computer 228 then instructs voice server 230, via data network 224, what type of message to play, and passes data parameters that enable voice server 230 to locate the message appropriate to the call state.

When the user uses telecommunication device 244, e.g., a telephone, to call an operator at a designated access number for information assistance, the call is routed to, say, information/call center 200. Referring back to FIG. 2A, an information assistance call is received by switching matrix platform 203 in center 200. In a well known manner, platform 203 derives, from the call set-up signals associated with the call, an ANI indicating the telephone number of device 244 from which the call originates. Switching matrix host computer 228 causes voice server 230 to seize the instant information assistance call. Host computer 228 then requests the user's personal profile associated with the ANI and the corresponding carrier's preferences through profile gateway 231 connected to data network 224. Profile gateway 231 in turn passes this request to profile manager 28. Personal profiles may be created as a result of a user answering a questionnaire about her biographical details and personal preferences at the time she signed up for a telephone service with a telephone carrier, which shares such personal profiles with the information assistance provider. The telephone carrier may also provide the information assistance provider with the carrier's preferences, in the form of records associated with its different telephone service plans, respectively. The particular carrier and its telephone service plan subscribed by the user is indicated in the user's personal profile.

Assume that John Doe, on an AT&T One Rate service plan, in this instance calls for information assistance from his home phone number "212-936-7363," and requests a listing of the Hilton Hotel in Portland, Oreg. In response, an operator conducts a search for the requested listing on database server 226. In accordance with the invention, the latter retrieves not only the requested listing, but also record 350 in FIG. 3 associated with the requested listing from an options database (not shown). In this example, record 350 concerns the Hilton Hotel (indicated in Name field 310), which has a phone number "503-255-8600" (indicated in Phone Number field 315), is assigned to category "Hotel" (indicated in Category field 305), and associated with six options—Hilton Reservation option 380, Hilton Restaurant option 381, Rental Cars option 382, Movies option 383, Sightseeing option 384, and Outlet Shopping option 385—indicated in Associated Options field 320.

In this instance, if option 380 is selected the operator would be connected to the Hilton central reservation system through a computer network, e.g., the Internet. This would enable the operator to make a hotel reservation for John Doe, without him separately calling the Hilton Hotel in Portland or entering reservation information on a Hilton's website (which is public access to the Hilton central reservation system).

Selection of Hilton Restaurant option 381 enables John Doe to obtain information about the business hours, and menu of the Hilton Hotel's restaurant, and to make a reservation for dining there or for room service delivery. It should be noted that option 381 may alternatively be configured as a generic restaurant option for selection of a nearby restaurant, instead. Selection of Rental Cars option 382 enables John Doe to rent a car from a car rental company conveniently located at the airport and in close proximity to the hotel, at sometimes discounted rates negotiated either by the hotel or by the information assistance provider. Selection of Movies option 383 enables John Doe to obtain a schedule of the movies and times to be shown at a nearby movie theater on the days of his trip to Portland, and to purchase tickets to be either held at the movie theater or to be delivered to the Hilton Hotel. Selection of Sightseeing option 384 enables John Doe to receive information about a variety of available bus and walking tours of Portland and to purchase any of them. Selection of Outlet Shopping option 385 enables John Doe to receive information about stores in a local outlet shopping mall which is frequented by locals and visitors to Portland, and to arrange for transportation to and from the outlet shopping mall on the day of his choice. After retrieving record 350, database server 226 transmits the record, or at least data concerning options 380 through 385, to host computer 228 via data network 224:

In response to the aforementioned request by host computer 228 for the user's personal profile and carrier's preferences through profile gateway 231, which includes the user's ANI (i.e., 212-936-7363 in this instance), profile manager 28 provides computer 228 with the requested John Doe's personal profile and AT&T One Rate service plan preferences from database 20. In this example, according to John Doe's personal profile 400, illustrated in FIG. 4, when he requests a listing of a hotel (indicated in Category field 405 of profile 400), he does not want to be presented with optional services or information regarding movies (indicated by "No Movies" preference 480 in Preferences field 418), or cars (indicated by "No Cars" preference 481). In addition, when John Doe requests a listing of a store (indicated in Category field 405), he does not want to be presented with optional services or information regarding shoes (indicated by "No Shoes" preference 482). Profile 400 also contains data 490 concerning the telephone service plan (i.e., AT&T One Rate service plan in this instance) to which John Doe subscribes. Based on data 490, manager 28 retrieves from database 20 a record (denoted 500 in FIG. 5) containing AT&T's preferences associated with its One Rate service plan. Record 500 is also provided to host computer 228.

Based on a comparison between options associated with Portland's Hilton Hotel, i.e., options 380-385, and John Doe's preferences, i.e., "No Movies" preference 480 and "No Cars" preference 481, host computer 228 decides that Rental Cars option 382 and Movies option 383 are not to be presented on the operator's terminal. In addition, host computer 228 examines AT&T's preferences in record 500. According to record 500, when a subscriber of the present AT&T telephone service plan, including John Doe in this instance, requests a listing of a hotel, (indicated in Category field 505), the subscriber should be denied optional services or information regarding sightseeing (indicated by "No Sightseeing" preference 580). Based on "No Sightseeing" preference 580 in this instance, host computer 228 determines that Sightseeing option 384 in Hilton Hotel record 350 is not to be presented on the operator's terminal, either. As a result, only Hilton Reservation option 380, Hilton Restaurant option 381, and Outlet Shopping option 385 are presented on the operator's terminal and thus made available to John Doe.

Figure 7:
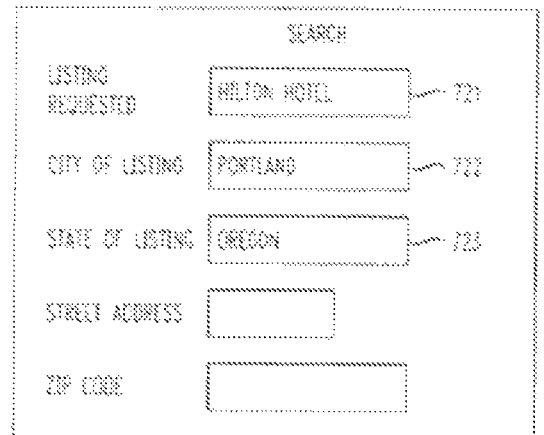
FIG. 7 illustrates a search template used to search for the requested listing in accordance with the invention.

FIG. 6 illustrates a routine for processing an information assistance call according to the present invention. In this example, John Doe places an information assistance call from the phone number 212-936-7363. Information/call center 200 in this instance receives the call in which John Doe requests the listing of "Hilton Hotel in Portland, Oreg.," as indicated in step 607. Using a well-known speech recognition technique, voice server 230 in step 609 transcribes the spoken request and fills the resulting transcription in search template 700 (illustrated in FIG. 7) displayed on operator terminal 220. The search for the requested listing is conducted through database server 226 based on the information in search template 700, as indicated in step 611.

Search template 700 illustratively includes, among others, Listing Requested box 721 containing the name of the requested listing ("Hilton Hotel"), and City of Listing box 722 and State of Listing box 723 containing the names of the city and state of the requested listing ("Portland" and "Oregon"), respectively.

Figure 8:
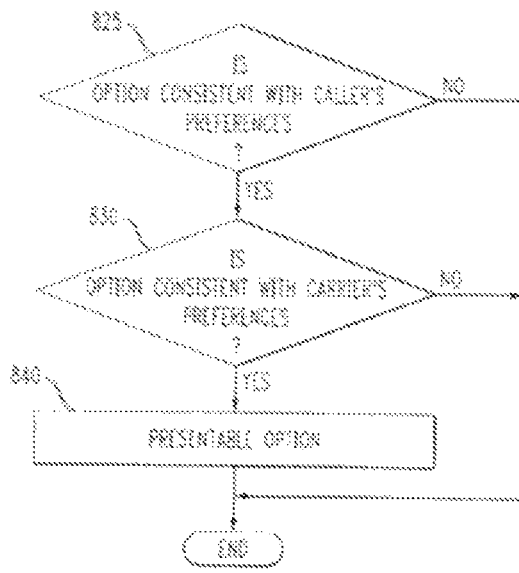
FIG. 8 is a flow chart depicting a routine for selecting service options associated with the requested listing for presentation in accordance with the invention.

FIG. 8 depicts a routine executed by host computer 228 for processing each of options 380-385 in Hilton Hotel record 350 resulting from the aforementioned search. For each of options 380-385, computer 228 in step 825 determines whether the option is consistent with the caller's preferences, i.e., preferences 480 and 481, as described before. If not, the routine comes to an end. Otherwise, if the option is consistent with the caller's preferences, computer 228 in step 830 determines whether the option is further consistent with the carrier's preference, i.e., preference 580, as described before. If not, the routine again comes to an end. Otherwise, computer 228 determines that the option is a presentable option, as indicated in step 840.

Figure 9:
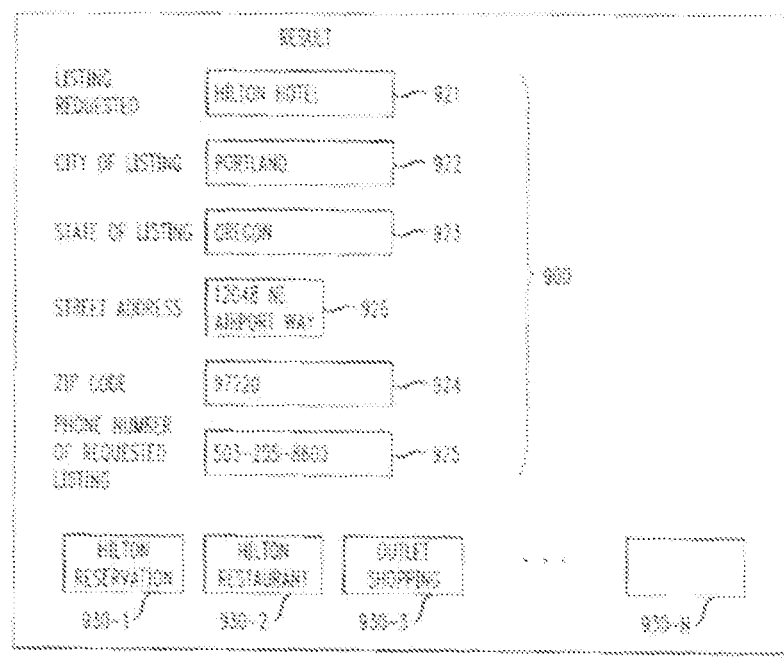
FIG. 9 illustrates a result template including the requested listing and selected service options in accordance with the invention.

After host computer 228 processes all options in record 350, host computer 228 identifies to database server 226 the presentable options, which in this instance are Hilton Reservation option 380, Hilton Restaurant option 381, and Outlet Shopping option 385. Database server 226 then causes the requested listing information and the surviving options to be presented on operator terminal 220. As shown in FIG. 9, the requested listing information is displayed in result template 900, and the surviving options are presented and in this instance selectable using soft keys 930-1, 930-2 and 930-3, respectively. These soft keys may be highlighted and may correspond to Function keys (e.g., F1 through F12) on a keyboard connected to terminal 220. In that case, they may be selected by pressing the corresponding Function keys. They may otherwise be selected using a mouse, touch screen or other user interface. Other keys 930-4 through 930-N in this instance are not assigned to any options and not highlighted, where N represents a predetermined number. In an alternative embodiment, for the operator's convenience, particular ones of soft keys 930-1, 930-2, . . . 930-N always correspond to certain common service options. For example, in the alternative embodiment, key 930-1 is always assigned to a reservation option, and key 930-3 is always assigned to a restaurant option.

Compared with search template 700, result template 900 additionally includes Phone Number of Requested Listing box 925 containing the Hilton Hotel phone number "503-255-8600," Street Address box 926 containing the Hilton Hotel address "12048 NE Airport Way," and Zip Code box 924 containing the Hilton Hotel zip code "97220."

Figure 10:
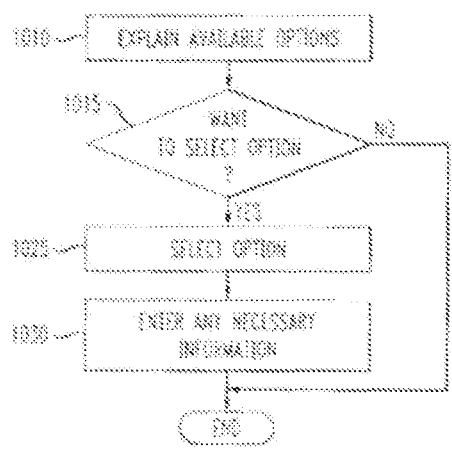
FIG. 10 is a flow chart depicting a routine for presenting the selected service options to the user in accordance with the invention.

FIG. 10 illustrates a routine whereby an operator presents each of available options 380, 381 and 385 to John Doe, in addition to the prior art option to connect John Doe to the Hilton Hotel phone number shown in result template 900. After the operator informs the user that there are three available options associated with Portland's Hilton Hotel, for each of the options, the operator explains what the option is about, as indicated in step 1010. In step 1015, the operator asks if the user wants to select the option. If not, the routine comes to an end. Otherwise, the operator in step 1025 selects the option for the user, and in step 1030 enters any necessary information to effect the option.

Figure 11:
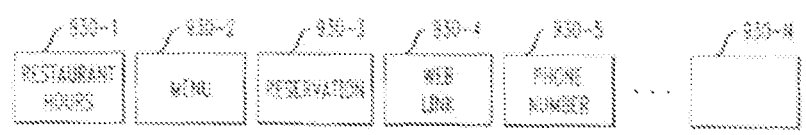
FIG. 11 illustrates a restaurant option template in accordance with the invention.

For example, John Doe in this instance wants to select Hilton Reservation option 380 and Hilton Restaurant option 381. By selecting key 930-1 corresponding to option 380 in this instance, a link to a reservation page (not shown) provided by the Hilton central reservation system is established, whereby the operator is able to enter on operator terminal 220 relevant information about John Doe and his itinerary to make the hotel reservation. (If the operator is unable to make the hotel reservation at that time, e.g., due to technical difficulties, database server 226 would store the relevant information, and the reservation process would be re-attempted at a later time without the user's prompting. Once the reservation is made, the user is informed about the completed reservation based on the preferred methods of communications, which may also be specified in John Doe's personal profile 400.) In addition, by selecting key 930-2 corresponding to Hilton Restaurant option 381 in this instance, a new set of options are presented, as shown in FIG. 11, by way of soft keys 930-1 through 930-5. For example, key 930-1 corresponds to a Restaurant Hours option; key 930-2 corresponds to a Menu option; key 930-3 corresponds to a Reservation option; key 930-4 corresponds to a Web Link option; and key 930-5 corresponds to a Phone Number option. The operator may communicate the new set of options to the user for selection.

Referring to FIG. 11, by selecting Restaurant Hours key 930-1, the operator can access the information about business hours of the Hilton Restaurant. By selecting Menu key 930-2, the operator can access the menu of the restaurant. By selecting Reservation key 930-3, the operator can make a reservation at the restaurant for John Doe by filling out a restaurant reservation page. In that case, information relevant to making the restaurant reservation is automatically extracted, e.g., from John Doe's personal profile 400, result template 900, and previous entries on the Hilton Hotel reservation page. The extracted information populates the restaurant reservation page by default. By selecting Web Link key 930-4, the operator can access reviews of the restaurant and its website where additional information about it may be available. By selecting Phone Number key 930-5, the operator can establish a voice connection to the restaurant, for example, to verify some information.

The foregoing merely illustrates the principles of the invention. It will thus be appreciate that those skills in the art will be able to devise numerous other arrangements which embody the principles of the invention and are thus within its spirit and scope.

For example, it would be appreciated by those skilled in the art that a user may have access to multiple telephones or communication devices, e.g., a home phone, a work phone, a cellular phone, a public phone, etc., and is likely to make information assistance calls from any of them. Since the present invention uses a personal profile to present to the user only the options in which she is interested, it is desirable that the user, regardless of the communications device used, be linked to her personal profile. To this end, when it is recognized that an information assistance call is placed from a communication device other than the communication device whose telephone number is associated with the personal profile maintained by the directory assistance provider, the latter may automatically ask the user to provide the telephone number registered with the provider, which is associated with her personal profile.

In addition, the options associated with a particular listing can be changed based on a request from the listed party or by the information assistance provider without any input from the listed party. Such options can include advertising messages, e.g., availability of discounts or coupons, whether or not they are related to the listing. For example, the information assistance provider in the disclosed embodiment may have an agreement with an Internet service provider (ISP) to promote its services. Thus, even when a user requests a listing for a shoe store (if the user's personal profile does not preclude this), the user would be informed about an option to subscribe to the services of the ISP. Moreover, more than one option for the same service from competing vendors may be associated with a listing.

Moreover, the term "operator" used herein broadly encompasses entities that are capable of providing assistance in a telecommunication environment, including without limitation human operators, voice response/recognition capabilities, web-enabled operator services, and other automated and electronic access.

Further, the invention equally applies regardless of whether feature group D (FGD) type signaling, SS7 out-of-band signaling or other signaling is used for communications between carrier switches and switching matrix platform 203 of FIG. 2A.

Finally, information/call center 200 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A computer implemented method for providing information assistance, comprising:

receiving, by an information assistance service, an information assistance communication from a user device, the communication including a request for a desired listing and an identifier identifying said user device from which the communication originated;

performing a search at a directory assistance system for the desired listing in response to the request;

retrieving at least one listing responsive to said request, said listing having one or more connected advertisements for additional services and offered by a third party not associated with the information assistance service, retrieving information concerning preferences associated with the user, said retrieved information being based on said identifier identifying said user device;

providing said retrieved listing to said user's device; and further suggesting to the user at least one connected advertisement entry for additional services for user selection, said suggestion to the user based on said retrieving information concerning preferences associated with the user.

2. The computer implemented method of claim 1 wherein the identifier includes a telephone number.

3. The computer implemented method of claim 1 wherein the identifier includes an automatic number identification (ANI).

4. The computer implemented method of claim 1, wherein said connected advertisement is related to the retrieved listing.

5. The computer implemented method of claim 1, wherein said connected advertisement is not related to the retrieved listing.

6. The computer implemented method of claim 1, wherein more than one connected advertisement is presented to said user device.

7. The computer implemented method of claim 1, wherein said more than one connected advertisement presented to said user device are from competing vendors.

* * * * *